Figure 1:
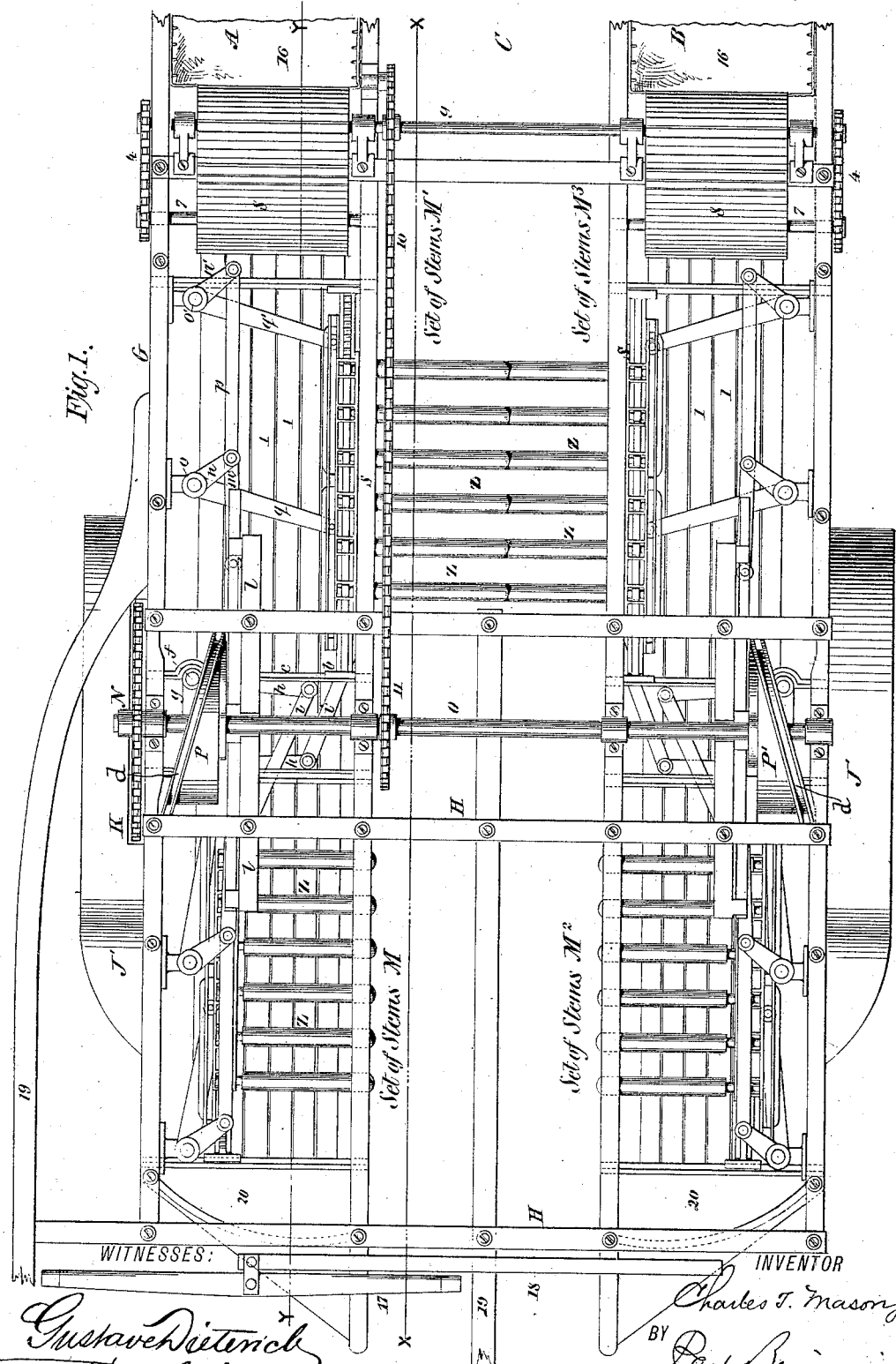

(No Model.) 7 Sheets—Sheet 1.

C. T. MASON, Jr.
COTTON HARVESTING MACHINE.

No. 371,960. Patented Oct. 25, 1887.

WITNESSES: Gustave Dieterich, Wm Goebel.

INVENTOR Charles T. Mason Jr. BY Ralph Benjamin ATTORNEY (No Model.) 7 Sheets—Sheet 2.

C. T. MASON, Jr.
COTTON HARVESTING MACHINE.

No. 371,960. Patented Oct. 25, 1887.

WITNESSES:
Gustave Dietrich
Wm. Goebel.

INVENTOR
Charles T. Mason Jr.
BY
Park Benjamin
ATTORNEY (No Model.) 7 Sheets—Sheet 4.

C. T. MASON, Jr.
COTTON HARVESTING MACHINE.

No. 371,960. Patented Oct. 25, 1887.

WITNESSES:
Gustav Dieterich
Wm. Goebel

INVENTOR
Charles T. Mason Jr.
BY
Park Benjamin
ATTORNEY (No Model.) 7 Sheets—Sheet 5.
C. T. MASON, Jr.
COTTON HARVESTING MACHINE.
No. 371,960. Patented Oct. 25, 1887.
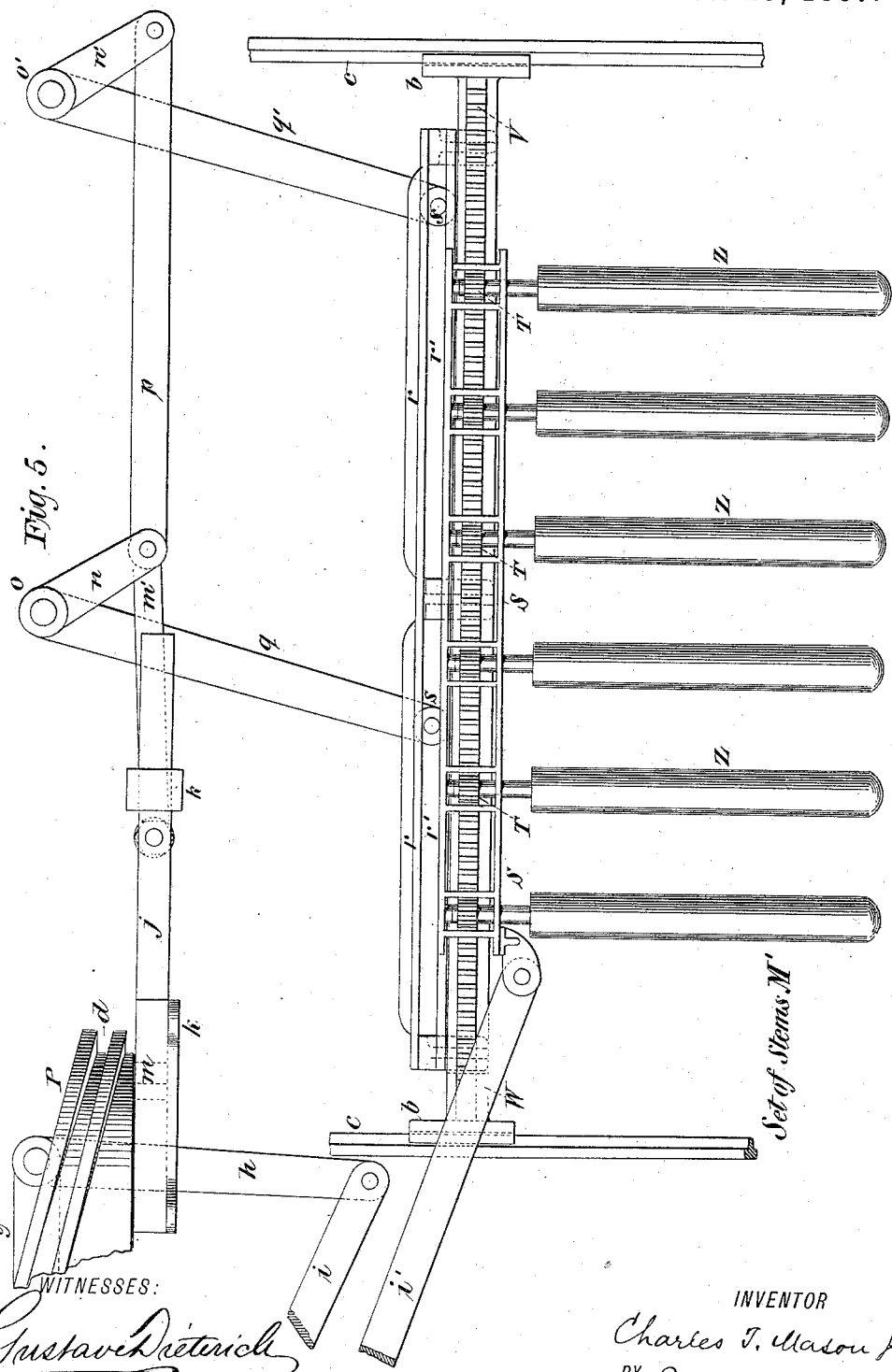
WITNESSES:
Gustave Dieterich
Wm Goebel.
INVENTOR
Charles T. Mason Jr.
BY Park Benjamin
ATTORNEY (No Model.) 7 Sheets—Sheet 6.
C. T. MASON, Jr.
COTTON HARVESTING MACHINE.
No. 371,960. Patented Oct. 25, 1887.
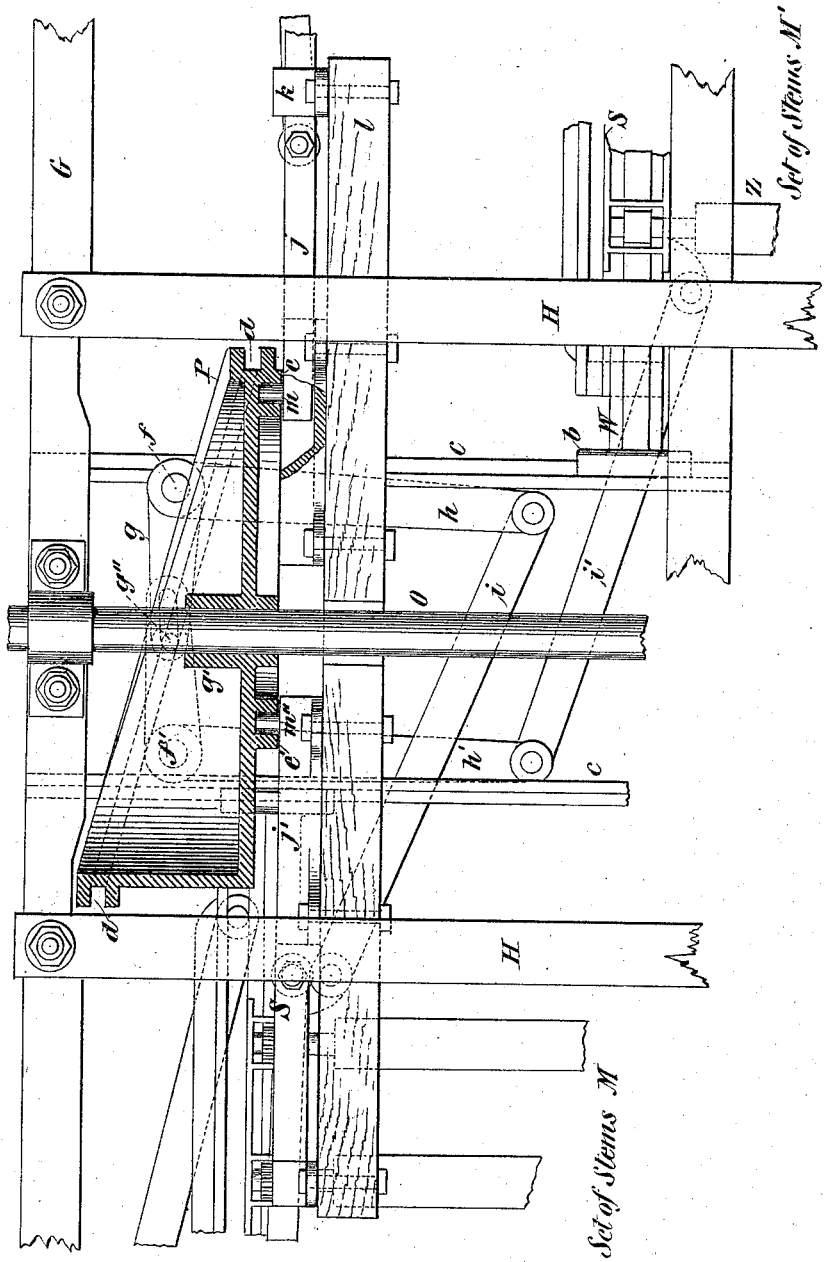
WITNESSES:
Gustave Dietrich
Wm. Goebel.
INVENTOR
Charles T. Mason Jr.
BY Park Benjamin
ATTORNEY (No Model.) 7 Sheets—Sheet 7.
C. T. MASON, Jr.
COTTON HARVESTING MACHINE.
No. 371,960. Patented Oct. 25, 1887.
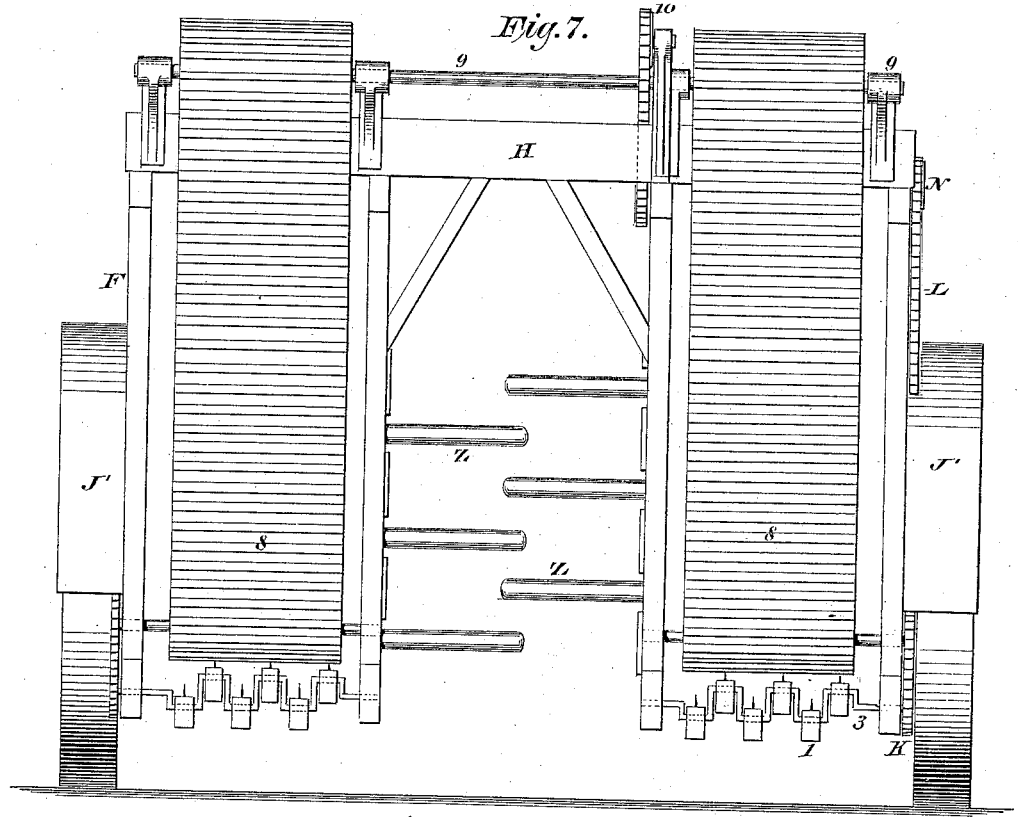
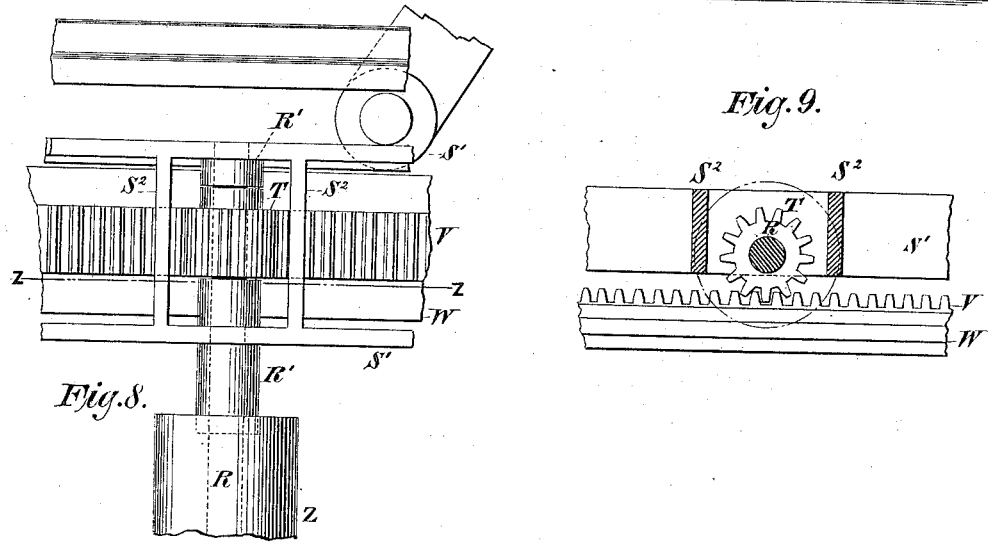
WITNESSES:
Gustave Dieterich
Wm Goebel
INVENTOR
Charles T. Mason Jr
BY
Park Benjamin
ATTORNEY

UNITED STATES PATENT OFFICE.

CHARLES T. MASON, JR., OF SUMTER, SOUTH CAROLINA, ASSIGNOR TO THE MASON COTTON HARVESTER COMPANY.

COTTON-HARVESTING MACHINE.

SPECIFICATION forming part of Letters Patent No. 371,960, dated October 25, 1887.

Application filed May 25, 1886. Serial No. 203,246. (No model.)

*To all whom it may concern:*

Be it known that I, CHARLES T. MASON, Jr., of Sumter, Sumter county, South Carolina, have invented a new and useful Improvement in Cotton-Harvesting Machines, of which the following is a specification, reference being had to the accompanying drawings, forming part hereof.

In Letters Patent No. 286,032, granted to me on the 2d day of October, 1883, I have described a cotton-harvester in which the cotton-picking stems are suspended by their rods or shafts in gangs and in a vertical position from picker-frames. Through the medium of suitable mechanism actuated by the movement of the machine the aforesaid pendent stems are moved downwardly in front of the machine, and then to the rear and up, then forward at the top, and down again, whereby the said stems are caused to penetrate the plants from above. The said stems, besides having this movement of revolution about a horizontal axis, also rotate on their individual axes in order to engage the cotton. I have found by actual experiment in the field that the aforesaid machine is a successful practically-operative cotton-harvester; but, on account of the dimensions which it must have to adapt it for the picking of cotton from tall plants, it is more especially adapted for use upon low cotton.

In Letters Patent No. 337,007, granted to me on March 2, 1886, I have fully described another form of cotton-harvesting machine in which the picking-stems are arranged radially around two vertical cylinders or supports. These cylinders are rotated and the stems are thus given a movement of translation over a circular path into and out of the two cotton-receiving compartments in which, respectively, the two cylinders are arranged, the plants passing between said compartments as the machine is drawn over the row. While the picking-stems move in the plants they are rotated on their individual axes in one direction to gather the cotton from the bolls, and when they are carried into the compartments they are rotated in the opposite direction to release the said cotton, which is then by suitable conveyers carried to receptacles attached to the rear of the machine. Numbers of these machines have been built and are now and for some time past have been in successful practical use for picking cotton in the field.

In an application for Letters Patent now pending, Serial No. 164,214, filed May 2, 1885, I have fully described a machine of construction substantially similar to the preceding, except that the cotton-picking stems are not rigidly maintained in a radial position with regard to the cylinders, but by suitable mechanism are caused during a portion of the rotary movement of the cylinder to assume a tangential position thereto. By this means the said stems are thrust into and withdrawn from the sides of the plant in a longitudinal direction and with a minimum of sidewise movement, while still being carried in a circular path by the revolving cylinder. It will be apparent, therefore, that in my first machine the stems are arranged in gangs which revolve around a horizontal axis, the stems remaining pendent and vertical. In my second machine the stems are placed radially and so revolve around a vertical axis. In my third machine the stems are similarly placed and similarly revolved, but during a part of the revolution stand tangential to the horizontal circle of rotation.

In my present machine I have adopted a construction and arrangement of stems differing from all of the foregoing. The general framing of the machine resembles that of my Patent No. 337,007—that is, I employ two compartments, between which is a space or interval for receiving the plants when the machine is drawn over the row. These are supported on wheels, and from one of the wheel-axles motion is imparted as the machine moves forward to the other mechanism, which is mainly in the compartments. The stems are arranged relatively parallel in tiers or gangs, and they rotate on their individual axes in one direction to gather the cotton and in the other direction to release it. The gangs of stems, however, have no rotary motion of translation similar to that of the stems in my Patent No. 286,032; neither are they in any sense carried around a vertical rotating support, as in my Patent No. 337,007; but on the contrary their resultant motion of translation while in the plant is approximately elliptical, while when retracted from the plant and into the compartments they travel simply in a straight line laterally. The effect is to cause the stems to enter and leave the plants in a straight line with reference to the plants themselves, for the forward movement of the machine is compensated for by the rearward movement of the stems, so that the latter do not in any wise drag in the plants.

My present invention therefore consists in the new disposition and arrangement of the stems and the novel mechanism for actuating the same, together with the various combinations and sub-combinations hereinafter more particularly described.

Figure 2:
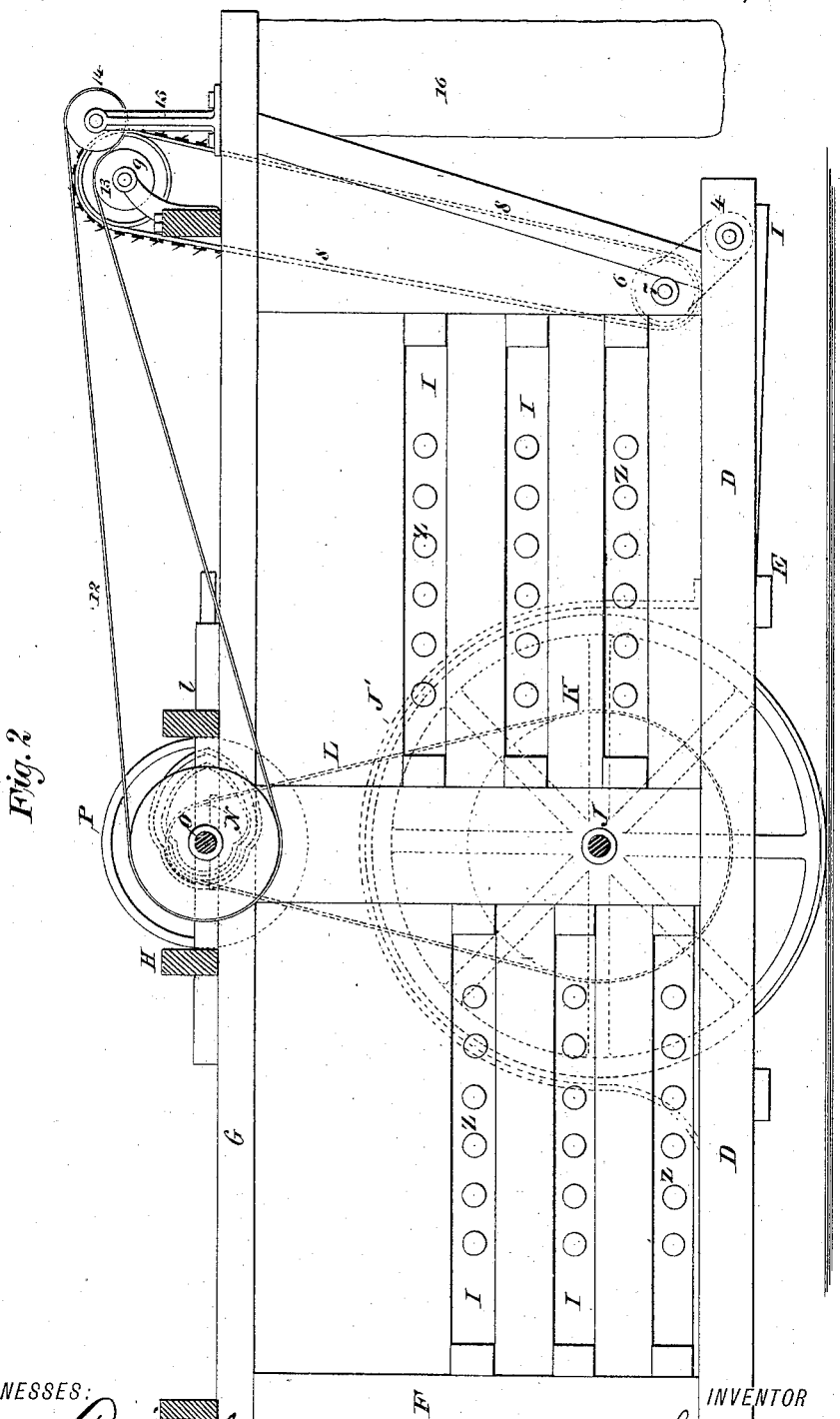
Figure 3:
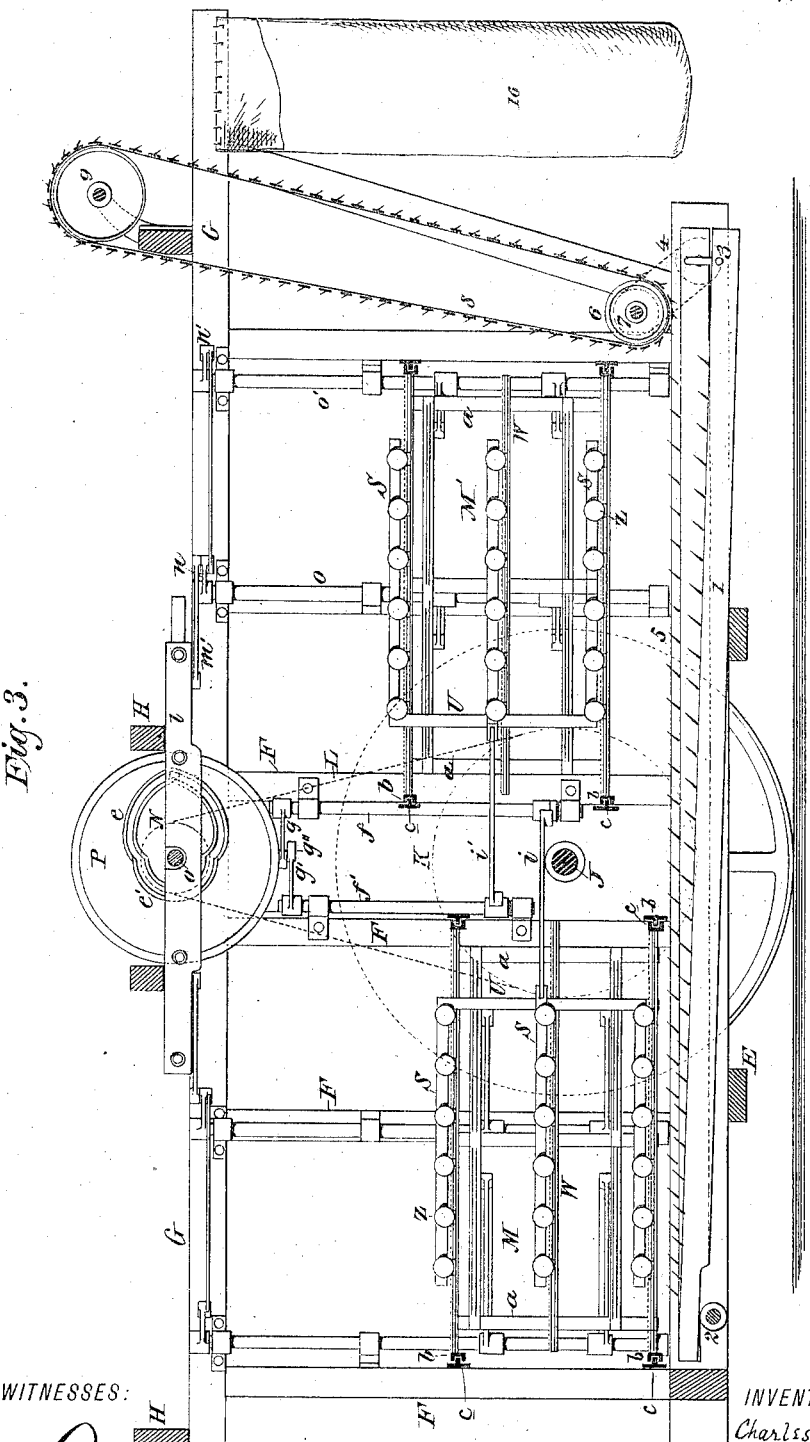
Figure 4:
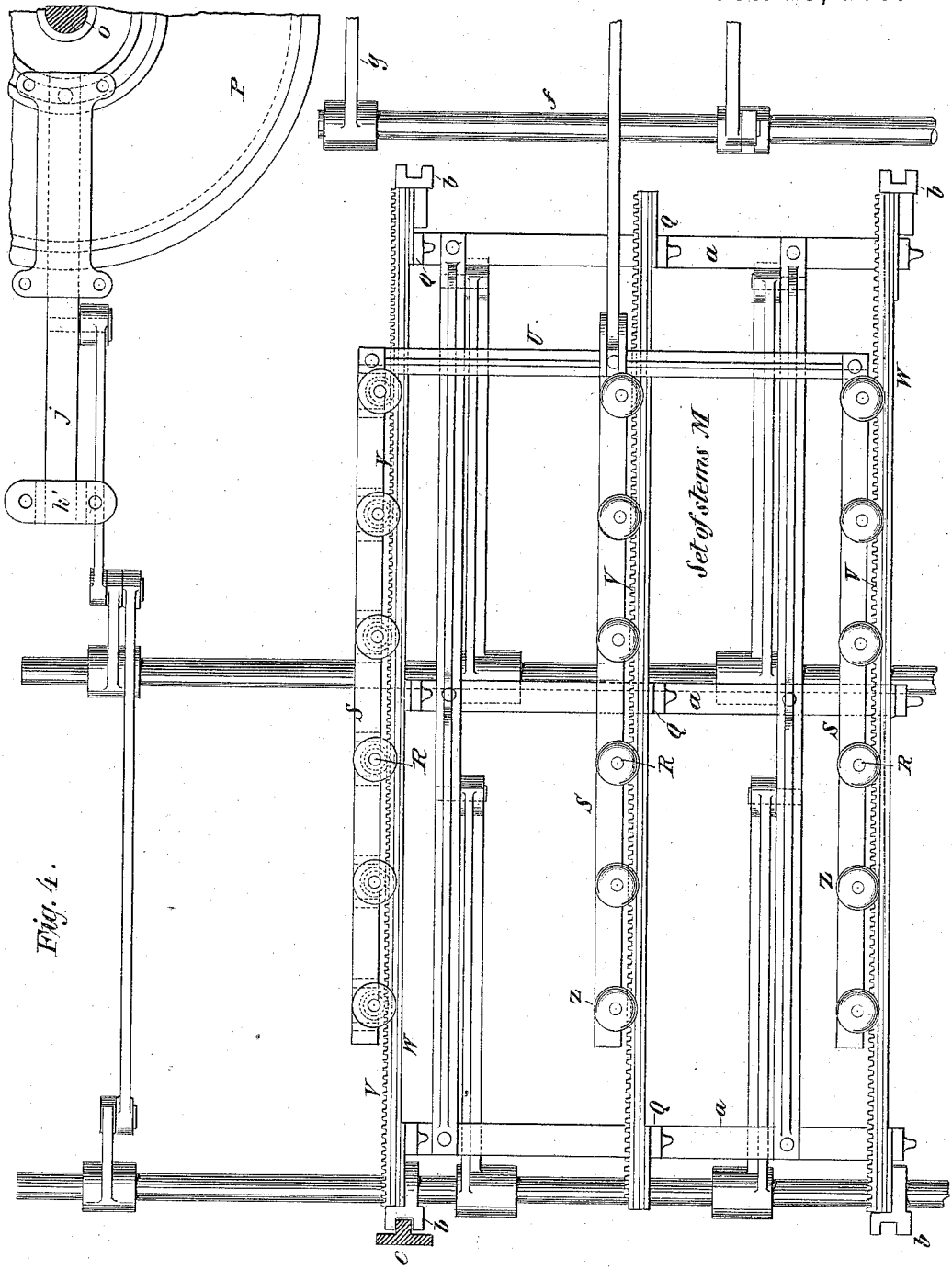

In the accompanying drawings, Figure 1 is a plan view. Fig. 2 is a vertical longitudinal section on the line Y Y of Fig. 1. Fig. 3 is a vertical longitudinal section on the line X X of Fig. 1. Fig. 4 is an elevation of the stem-carrying supports of the stem-frames and of the racks for rotating said stems on their individual axes. Fig. 5 is a plan view in detail of the mechanism for protruding and retracting the stems and for revolving the same. Fig. 6 is a horizontal section of the cam-cylinder and mechanism immediately associated therewith for actuating stem-frames and stems. Fig. 7 is a rear elevation of the machine, the cotton-receiving bags and their supports being omitted. Fig. 8 is a plan view in detail of the rack-and-pinion mechanism for revolving the stems individually. Fig. 9 is a vertical section on the line Z Z of Fig. 8.

Similar letters of reference indicate like parts.

The framing of the machine is substantially like that described in my prior patent of March 2, 1886.

Two compartments, A and B, Fig. 1, are formed with an intermediate space, C, between them, through which the plants pass when the machine is drawn over the row. Generically described, the frame consists of bottom longitudinal beams, D, beneath which are cross-beams E, Fig. 2. Upright supports F carry the top longitudinal beams, G, between which extend the cross-beams H. These members are securely bolted or otherwise fastened together and relatively disposed substantially as shown in the drawings. The compartments are sheathed or boarded on their sides and ends. Suitable openings, I, Fig. 2, are made in the covering of the inner side of each compartment, through which openings the stems Z pass in entering and leaving the space C.

The wheels which support the machine are carried upon short axles J, Fig. 3, journaled in the outer sides of the compartments A and B. Upon one of these axles is mounted a pulley, K, whence motion is transmitted to the mechanism, so that the said mechanism is operated by reason of the travel of the machine. Coverings J' extend over the tops of the wheels.

The picker-stems Z are in four sets, M M' M² M³. Two sets, M M', are arranged in compartment A, (one set being disposed in front and the other in rear of the position of the wheel,) and two sets, M² M³, in compartment B.

A set of picker-stems may include several horizontal tiers of stems, all of which stems operate simultaneously. Thus, by reference to Fig. 3, will be seen the two sets M M' of stems, each of which sets is composed of three tiers of stems. Similar mechanism exists in the two compartments A and B for actuating the sets of stems therein—that is to say, the mechanism in one compartment is duplicated in the other; hence it is necessary to describe in detail the instrumentalities for actuating the sets of stems of but one of the compartments.

From the pulley K on the axle extends upwardly a belt or, preferably, a chain, L, (dotted lines, Figs. 2 and 3, and full lines in Fig. 7,) which passes over the pulley N on the transverse shaft O. Fast upon this shaft and on opposite sides of the machine are two cam-cylinders, P P'. These cam-cylinders respectively communicate motion to the stem mechanism in the compartments A and B, as will be hereinafter explained.

Especial reference is now made to the cotton-picking stems and the mechanism whereby they are operated from the cam-cylinders. The individual stems may be of any of the forms invented and already patented to me—such, for example, as is represented in my aforesaid patent of March 2, 1886. Each stem is provided with pointed teeth, which are disposed in or upon its outer surface, the points of said teeth all being turned in the same direction. As I have fully described them in my former patents, it is not necessary to set forth the construction of said stems in detail here. The general principle common to all forms is, however, that the teeth are so constructed, disposed, and arranged that they will engage the cotton only, and will not catch leaves, stalks, or any other portions of the plant. This engagement of cotton happens when the stems are rotated on their individual axes with the points of the teeth foremost after being brought into proximity to the open cotton-bolls. The cotton thus engaged is easily released from the stems by simply reversing their motions on their axes, when the lint is thrown off by its own inertia, all as fully described in my patent aforesaid. It will be seen hereinafter that means are provided for rotating said stems on their individual axes first in one direction to enable them to gather the cotton and then in the reverse direction to cause them to release it. Furthermore, means are also arranged to introduce the stems horizontally into the plants points foremost, to move them bodily rearward at the same speed as the machine as a whole is drawn forward, so that the stem shall have no dragging action on the plant, and, finally, to withdraw them from the plant. These two sets of motions—namely, individual rotation on their own axes and the protruding, rearward, and retracting movements of translation of the stems—take place as follows: During the first half of its rearward movement in the plant-space the stem is also moving outwardly from the compartment. During the second half it is moving inwardly into the compartment. Therefore, by reason of its resultant movement, a point on a stem so moved describes an elliptical path in the space C; but, as has been stated, the stem is carried rearwardly at the same speed as the machine is moved forward over the plant. Therefore the motion of the stem with reference to the plant is simply an insertion end foremost or longitudinally into the plant and a withdrawal therefrom. While the stem is in the plant, and hence during the period of its entrance therein and also during that of its withdrawal therefrom, it rotates on its own axes, with points of its teeth foremost, and so engages all the cotton in the bolls with which it comes in contact. When the stem has been withdrawn from the plant, it has moved from the space C into the compartment. In that compartment it now travels laterally forward—that is, in the same direction as the machine is moving—and at the same time it rotates on its own axes in the reverse direction from that which it had while in the plant. The effect of rotating the stem in the reverse direction on its own axis is to release the cotton from the teeth. The effect of moving the stem laterally forward is to return it to the position from whence it started, ready to be again introduced into the plant and to begin anew the cycle of operations just described.

The stems of the three tiers forming a set, as above explained, are all moved simultaneously. For the sake of clearness, the mechanism of only one set of stems is now explained in detail, it being understood that the corresponding mechanism of the other sets is similar in construction and arrangement.

In Fig. 4 a single set of stems is shown. The individual stems Z are provided with central rods or shafts, R, which shafts are at their ends journaled in the opposite sides of the bar S. As there are three tiers of stems, there are three bars S, and six stems are here shown journaled in each bar. In Figs. 8 and 9 a portion of the bar S is shown enlarged, from which it will be seen that said bar consists of two side plates, S', between which are transverse partitions S², forming alternate small and large compartments. Upon the shafts R are sleeves R', Fig. 8, which are secured in the side plates, S', and serve as bearings for the said shafts. Upon each of said shafts is rigidly secured a toothed pinion, T. The three bars S are connected together by a vertical bar, U, Figs. 3 and 4; hence the said three bars S and the bar U form a structure which may be moved as a unit. All the pinions T rest upon the racks V, Figs. 4, 8, and 9. Therefore all the bars S are in this way supported. The racks V are formed upon or attached to the upper surfaces of the bars W, same figures, which bars W are supported upon brackets Q, secured to the three upright supports a, Fig. 4. Consequently the three bars W and the three supports a form a connected frame, which also moves as a unit.

Secured to the ends of the upper and lower bars W, Figs. 3, 4, and 5, are recessed slides b. The recesses of these slides receive the projecting ribs of the four-way bars c, which are secured to the frame of the machine, as clearly shown in Fig. 3.

To recapitulate, the horizontal rack-bars W, carrying the racks V and placed one above the other, are connected to form a frame by the three supports a. The frame thus composed is supported by means of the slides b upon the ribbed bars c, which bars stand transversely of the compartment. Consequently the frame may move to and fro (the slides traveling on the ways) transversely of the compartment. The stem supporting bars S, being all connected by the upright bar U, are supported on the racks V of the bars W by the pinions T. Consequently all the bars S may be moved as a unit to and fro and lengthwise the racks V. The picking-stems project from the bars S.

As has already been stated, when the rack-bar frame is moved transversely of the compartment, all the stems are moved through the openings I, Fig. 2, in the inner side of the compartment into and out of the plant-receiving space C, and hence into and out of the plants. When the bars S, supporting the stems, are caused to travel in one direction on the racks V, all the stems of the set move laterally and in a direction rearward of the machine. When the bars S are caused to travel in the opposite course, all the stems of the set move laterally and forwardly of the machine. It remains, therefore, to impart to the stem-frame (bars S and U) and the rack-frame (bars V W and supports a) the proper relatively-timed motions to cause the stems to move into and out of the plants and to travel rearward and forwardly of the machine in the manner already described. Furthermore, it will be easily apparent that when the stem-frame is moved over the racks the pinions T on the stem-rods will mesh with said racks, and hence the stems will be rotated on their individual axes in one direction when the stem-frame is moved rearward of the machine and in the opposite direction when it is moved forwardly of the machine.

It has already been stated that the picking mechanism in each compartment is driven from the cam cylinders P P'. Therefore the devices now to be explained serve to communicate the proper motions from cam-cylinder to the stem-frame and the rack-frame of each of the two sets of stems which are present in either compartment—that is to say, one cam-cylinder in each compartment actuates the two stem-frames and the two rack-frames belonging to the two sets of stems in said compartment. For the present, however, I shall refer to the operation of the cam-cylinder with the frames of one set of stems, premising that the same cylinder operates the frames of the other set by like mechanism.

Reference to the sectional view of the cam-cylinder P, Fig. 6, will show that said cylinder has two cam-surfaces—namely, on its periphery and on one of its faces. The peripherical cam-groove is best represented at $d$, Figs. 1 and 6. The face cam-groove is shown at $e$ in said Fig. 6, and also in Figs. 2 and 3 and partly in Fig. 4. The face cam-groove over its portion $e'$, Fig. 3, is a true semicircle. The function of the peripherical groove $d$ is to convey motion to the mechanism which causes the stem-frame to travel to and fro longitudinally on the rack-frame. The function of the face cam-groove $e\,e'$ is to convey motion to the mechanism which causes the rack-frame to move on its ways to and fro in a direction transversely of the machine.

Referring first to the mechanism operating the stem-frame, $f$ and $f'$, Fig. 3, are two vertical shafts supported in suitable bearings on the frame uprights F. To the upper end of the shaft $f$ is secured a lever-arm, $g$, Fig. 3, dotted lines, Fig 6, and shown in part in Fig. 4. This arm carries a cam-roller, $g''$, Fig. 6, dotted lines, which enters the cam-groove $d$ of the cam-cylinder P, dotted lines, Fig. 6. Near the lower bearing of the shaft $f$ is secured a lever-arm, $h$, at about right angles to the arm $g$, Figs. 3 and 6. Pivoted to the end of arm $h$ is a link-bar, $i$. The other end of the bar $i$ is pivoted to a bracket on the stem-supporting bar S, Figs. 5 and 6. When the cam-cylinder P is rotated, the roller, on the end of arm $g$ necessarily follows the groove $d$ on the periphery of said cylinder. Therefore a rocking motion is imparted to the shaft $f$ and arm $h$, the arms $g$ and $h$, in fact, forming a bell-crank lever. Thus through the medium of the pivoted link-bar $i$ a to-and-fro motion is imparted to the bar S and its associate similar bars upon the racks V.

It will be observed that the rock shaft $f$ transmits motion to the mechanism which vibrates the stem-frames of the front set of stems, M. In like manner the rock-shaft $f'$ transmits motion to the mechanism which vibrates the stem-frames of the rear set of stems, M'. On the shaft $f'$ is a lever-arm, $g'$, similar to arm $g$ on shaft $f$. The ends of both arms $g'$ and $g$ are linked together by the cam-roller $g''$, which is on the end of arm $g$ and passes through a slot in the end of arm $g'$. (See dotted lines, Fig. 6.) The shaft $f'$ carries a lever, $h'$, similar to lever $h$, and this connects with the link-bar $i'$, similar to the link-bar $i$, said bar $i'$ being jointed to the bars S of the set of stems M', as shown in Figs. 5 and 6. It will be understood, therefore, that both arms $g\,g'$ are vibrated simultaneously by the revolution of the cam-cylinder P, and that hence both stem-frames belonging to the sets of stems M and M' are thus simultaneously operated; but inasmuch as the rock-shafts $f\,f'$ are on opposite sides of the center of the revolving cam-cylinder P the stem-frames are moved in relatively-opposite directions—that is, when the stem-frame belonging to the set of stems M moves forward the stem-frame belonging to the set of stems M' moves rearward, and vice versa.

I will now explain the mechanism for moving the rack-frames upon the ways $c$, in the manner already described.

$j$, Fig. 6, is a bar, which is free to move in clips $k$, attached to the longitudinal frame-piece $l$. At one end of this bar is a cam-roller, $m$, which enters the cam-groove $e$. Considering, first, simply these parts, it will be obvious that when the cam-cylinder P rotates, while the cam-roller $m$ on the bar $j$ is passing around the portion $e$ of the cam groove, then by reason of the shape of the said groove, Fig. 3, a reciprocating movement will be imparted to said bar in its clips; but when the roller passes around the true semicircular part $e'$ of said groove, then no motion will be imparted to said bar $j$. Therefore during a half-revolution of the cam-cylinder P the bar $j$ will make one reciprocation forward and back, and during the remaining half-revolution it will stay motionless.

Referring now more particularly to Figs. 3 and 5, pivoted to the under side of bar $j$ is a link, $m'$, which at its other end is connected to the lever-arm $n$ of the upright rock-shaft $o$. A similar rock-shaft, $o'$, has a lever-arm, $n'$, and these two arms $n\,n'$ are linked by the bar $p$, so that when motion is communicated from the cam-cylinder P through the bar $j$ and link $m$ to the arm $n$ both rock-shafts $o\,o'$ are simultaneously rocked. Secured to each of the shafts $o\,o'$ are two lever-arms, $q\,q'$. On the rear side of the upper and lower rack-bars W are plates or bars $r$, between which and the bars W spaces, recesses, or slots $r'$ are formed. Into these slots enter rollers $s$ on the inner ends of the arms $q$. This is best shown in Fig. 5. Now, when the rock-shafts $o\,o'$ are vibrated, as already described, the ends of the arms $q\,q'$ move in arcs of circles; but by reason of their connection with the bars W, and also by reason of the fact that said bars are supported on the transverse ways $c$, it follows that a rectilinear reciprocating motion is given to the rack-frame in a direction transversely of the machine. The corresponding rack-frame of the other set of stems, M, is operated by similar mechanism. Also, supported in clips $k'$ on the same frame member $l$ is a sliding bar, $j'$, similar to $j$, which, through means of levers, links, and rock-shafts, (shown in Fig. 4,) and similar to those already described, causes the reciprocation of the aforesaid rack-frame; but it should be noticed that the arrangement of the bars $j\,j'$ is such that their respective ends, bearing the cam-rollers $m''$, Fig. 6, are disposed on opposite sides of the center of the cam-cylinder P. Consequently, while the roller $m$ is in the part $e$ of the cam-groove the roller $m''$ is in the part $e'$, and vice versa. Wherefore it follows that while the bar $j$ is reciprocating the bar $j'$ is motionless, and conversely.

To recapitulate: Through the revolution of the cam-cylinder P a cam-groove, $d$, on the periphery of that cylinder, through the medium of the levers $g\ g'$, causes the vibration of the rock-shafts $f f'$ simultaneously, and these rock-shafts, respectively, by means of their lever-arms $h\ h'$ and the links $i\ i'$, impart reciprocating motion to the bars S belonging, respectively, to the stem-frames of the sets of stems M and M'. By reason of the disposition of the said rock-shafts and their levers, connected by the cam-roller pin $g''$, with reference to the cam-cylinder, the two stem-frames are moved in relatively-opposite directions on the rack-bars. Also, through the revolution of the cam-cylinder P the cam-groove $e$ on the face of said cylinder causes the reciprocation alternately of the bar $j$ and the bar $j'$. The bar $j$, through the rock-shafts $o\ o'$ and links and levers described, causes the reciprocation on its ways of the rack-frame of the set of stems M' in a direction transversely the machine. The bar $j'$, through like mechanism, causes the reciprocation on its ways in like manner of the rack-frame of the set of stems M; but, by reason of the part $e'$, (one-half of the face cam-groove being a true semicircle,) when the bar $j$ reciprocates the bar $j'$ is motionless, and vice versa.

The mechanism which operates the sets of stems $M^2$ and $M^3$ of the compartment B is similar in all respects to that already described for operating the sets of stems M M' of the compartment A and is actuated from the cam-cylinder P'.

It will be seen from Fig. 3 that the tiers of stems of the set M' in compartment A alternate in relative position with the tiers of stems of the other set, M, in the same compartment. So, also, the tiers of stems of the set $M^3$ in the compartment B alternate with the tiers of stems of the set $M^2$.

From Fig. 1 it will further be apparent that the tiers of stems of set $M^2$ in compartment B alternate in position with the tiers of stems of set M in compartment A, and the same is true of the tiers of stems of the sets $M^3$ and $M^2$. Therefore when the sets of stems M and $M^2$ on opposite sides of the machine enter the plant-receiving space A the tiers of stems of one set enter the intervals between the stems of the other set; and so, also, of the tiers of stems belonging to the sets M' and $M^3$. The object of thus disposing the stems is to enable them to pass into all portions of the plants, so as to avoid missing any of the open bolls.

Tracing, now, the operation of the sets of stems in the actual employment of the machine, as the latter advances over the row the sets of stems M and $M^2$ on opposite sides advance into the plant-receiving space, move rearward, and return into the compartment. While they are in the plants, all of said stems are rotated on their own axes, points of picking-teeth forward, and therefore they collect all cotton with which they come in contact. As these sets of stems are retracted, the rear sets of stems, M' and $M^3$, advance into the plants and operate in similar manner. Meanwhile the sets M and $M^2$ have been withdrawn entirely into their respective compartments, and while therein they move laterally and forwardly of the machine to their original position, at the same time turning on their individual axes in the reverse direction, whereby the cotton upon them is thrown off. By this time the rear sets, M' and $M^3$, have completed their travel in the plants and enter the compartments. Then the sets $M^2$ and M are protruded again and the sets M' and $M^3$ discharge their cotton. Thus the operation of the sets goes on alternating, and it will be observed that each plant is first searched by the front sets and then by the rear sets of stems as by the motion of the machine the latter in turn come up to it. There are certain advantages, here to be noted, obtained by arranging the stems parallel in their supporting-bars. Where the stems are disposed radially around a ring or disk, the interval between them is of gradually-diminishing width, so that the plants are apt to wedge therein. So, also, in any arrangement where the stems normally radiating are brought into parallelism the space between them thus becomes contracted, and the plants are for this reason crowded or packed together. By placing the stems parallel and so maintaining them this crowding or bunching of the plants is avoided.

It sometimes happens that broken bolls become entangled with the cotton, so that when the latter is seized by the stem the boll comes with the lint and is carried into the receiving-compartment and so into the mass of gathered cotton. I find that when the stems are placed at comparatively short distances apart and parallel, as here represented, a boll entangled with one stem commonly strikes the next stem, which tears it from the first. The boll is then taken by the following stem, and so it is passed from stem to stem of the row until the last stem throws it entirely off.

Another advantage of arranging the stems and operating them in the manner here described, instead of disposing them radially or otherwise around a vertical rotating cylinder, is that I am enabled materially to reduce the width of the receiving-compartments, which, as shown in Fig. 1, need be no wider than is necessary to accommodate the stems and the folded levers when said stems are drawn in. With cylinders and radial stems sufficient space must be afforded to allow the stems to be carried around through the compartment and out again.

Having now described the picking mechanism and its operation, I will proceed to explain the devices for receiving the cotton from the stems and elevating it to the bags.

At the lower portion of each compartment are a series of parallel bars, 1, Figs. 3 and 7. The forward ends of these bars in each compartment rest upon a transverse round bar or roller, 2. Through their front ends passes a crank-shaft, 3, the cranks of which, as shown in Fig. 7, are set alternating. On the upper sides of the bars 1 are projecting points 5, which are inclined toward the rear of the machine. Upon each crank-shaft 3 is a pulley, 4, dotted lines, Figs. 2 and 3, which, by means of a belt or chain, receives motion from the pulley 6. The pulley 6 is on the short transverse shaft 7. Over rolls on this shaft passes the conveyer-apron 8, the said apron also passing over rolls on the shaft 9, Fig. 1. The shaft 9 may be rotated directly by a chain belt, 10, communicating with the pulley 11 on shaft O, as in Figs. 1 and 7, or by an ordinary flat belt, 12, as in Fig. 2. In the latter case the belt may pass over a pulley, 13, on the shaft 9 and around a pulley, 14, on a fixed bracket or standard, 15. On the conveyer-apron 8 are upwardly-turned points or teeth. The cotton-receiving bags 16 are secured to the projecting longitudinal members G of the frame in rear of the machine, as shown in Figs. 2 and 3.

The operation of the above-described mechanism is as follows: As the cotton falls from the stems, it is received by the vibrating bars 1, and, by reason of the points 5 on these bars and the motion imparted to said bars by the crank-shafts 3, the cotton is moved rearwardly until it meets the upwardly-moving side of the conveyer-aprons 8. It is then engaged by the teeth on said aprons, carried upward, and finally delivered into the bags 16, which are suitably placed to receive it.

The animal which draws the machine is hitched to the whiffletree 7, which is pivoted to the equalizing-bar 18. At 19 are the shafts, and at 20 are pilots for pushing aside the plants of adjacent rows.

I claim—

1. In a cotton-harvester, a cotton picking stem, mechanism, substantially as set forth, for imparting to said stem, first, an advance movement in a right line, point foremost, in the direction of its axis; second, a sidewise movement in a right line at right angles to the direction of its axis; third, a return movement, point rearmost, in a right line in the direction of its axis, and, fourth, a sidewise movement in a right line opposite in direction to said first-mentioned sidewise movement, and means for rotating said stem on its axis in one direction during movements one, two, and three, and in the opposite direction during movement four.

2. In a cotton-harvesting machine, a compartment, two sets or groups of cotton-picking stems, M M', in said compartment, each set containing two or more tiers of stems placed relatively parallel and horizontally, the tiers of each set being disposed one above the other and the tiers of the respective sets alternating and occupying different operating positions, and means for advancing and retracting each set of stems in the direction of the longitudinal axes of said stems out of and into said compartment, substantially as described.

3. In a cotton-harvesting machine, a compartment and two sets of horizontal cotton-picking stems, M M', occupying different operating positions therein, in combination with mechanism for protruding from said compartment first one and then the other set of stems in the direction of the longitudinal axes of said stems, substantially as described.

4. In a cotton-harvesting machine, a compartment and two sets of horizontal cotton-picking stems, M M', supported and occupying different operating positions therein, in combination with mechanism for moving simultaneously said sets of stems laterally and in relatively-opposite directions, substantially as described.

5. In a cotton-harvesting machine, a compartment and two sets or groups of horizontal cotton-picking stems, M M', occupying different operating positions therein, in combination with means for imparting to the stems of either of said sets simultaneously a longitudinal movement and a lateral movement rearward of the machine, and means for imparting during the same period of time to the stems of the other of said sets a lateral movement forwardly of the machine, substantially as described.

6. In a cotton-harvesting machine, two compartments and a plant-receiving space between the same, two sets of picking-stems, M M' and $M^2 M^3$, occupying different operating positions in each of said compartments, and means for advancing alternately the pair of sets M M' and the pair of sets $M^2 M^3$ into said plant-receiving space, substantially as described.

7. In a cotton-harvesting machine, two rotating cams, in combination with a cotton-picking stem and two intermediate mechanisms for communicating motion from said cams to said stem, one of said mechanisms being controlled by one cam to move said stem in a lateral direction and the other of said mechanisms being controlled by the other cam to move said stem in a longitudinal direction, substantially as described.

8. In a cotton-harvesting machine, a rotary cylinder having two cam-surfaces, in combination with a cotton-picking stem and intermediate mechanisms for communicating from said cam-surfaces, respectively, a lateral movement and a longitudinal movement to said stem, substantially as described.

9. In a cotton-harvesting machine, a rotary cylinder having a cam-surface on its periphery and a cam-surface on its face, in combination with a cotton-picking stem and intermediate mechanisms for communicating from said cam surfaces, respectively, a lateral and a longitudinal movement to said stem.

10. In a cotton-harvesting machine, the cam-cylinder P, having the face-grooves e e', and the sliding-bars j j', carrying the rollers or pins m m'', adapted to enter said grooves e e', in combination with the stem-carrying reciprocating bars W of the sets of stems M M', and intermediate mechanism, as set forth, between said bars W and bars j j', substantially as described.

11. In a cotton-harvesting machine, the cam-cylinder P, having the peripherical groove $d$, the linked lever-arms $g$ $g'$, and pin $g''$, in combination with the stem-carrying bars S of the sets of stems M M', and intermediate mechanism, as set forth, between said bars S and arms $g$ $g'$, substantially as described.

12. The cam-cylinder P, having the peripherical cam-groove $d$ and the face cam-groove $e$ $e'$, in combination with the lever-arm $g'$, rock-shaft $f'$, arm $h'$, link $i$, bar S, and stems Z, and the bar $j$, pivoted bar $m'$, arm $n$, rock-shaft $o$, arm $q$, bar W, having recess $r'$, slides $b$, and ways $c$, substantially as described.

13. The combination of a cotton-picking stem journaled at one extremity of its axis in a support, a pinion on said axis, a single rack-bar in proximity to said pinion, and a means of reciprocating said support, and, through the engagement of said pinion and said rack-bar, thereby rotating said stem in alternately-opposite directions by said bar, substantially as described.

14. The combination of a series of cotton-picking stems disposed relatively parallel and horizontal and journaled at one extremity of their axes in a common support, pinions on said axes, a single rack-bar disposed horizontally and adapted to engage with said pinions, and means for reciprocating said support, whereby all of said stems are caused to rotate simultaneously first in one and then in the opposite direction by said bar, substantially as described.

15. The combination of a cotton-picker stem, Z, support S, pinion T, rack V, and a means of reciprocating said support, substantially as described.

16. The combination of a cotton-picker stem, Z, bar S, pinion T, rack V, link-arm $i$, lever-arm $h$, rock-shaft $f$, lever-arm $g$, cam roller or pin $g''$, cam-cylinder P, having the cam-groove $d$, and mechanism for rotating said cylinder by the movement of the machine, substantially as described.

17. The combination of the cotton-picker stem Z, having a rod or spindle, R, sleeves R' on said rod, and bar S, formed of the longitudinal plates S' and cross-partitions S², substantially as described.

18. Two or more bars, S, and cotton-picker stems projecting therefrom, the said bars being placed one above the other, supports for said bars, a connecting-piece, U, uniting said bars, and means for reciprocating said bars longitudinally upon said supports, substantially as described.

19. The combination of two or more cotton-picker stems, Z, bar S, supporting the same and supported on bar W, a support for said bar W, a means of reciprocating the bar S longitudinally, and a means of reciprocating the bar W laterally, substantially as described.

20. The combination of two or more cotton-picking stems, bar S, supporting the same and supported on bar W, a means of reciprocating said bar S longitudinally, bar W, slides $b$, ways $c$, and a means of reciprocating said bar W upon said ways, substantially as described.

21. The combination of the laterally-reciprocating bar W, having the recess $r'$, lever-arm $q$, carrying a roller or pin, $s$, entering said recess, rock-shaft $o$, lever-arm $n$, link $m'$, bar $j$ and guides therefor, cam-cylinder P and cam-groove $e$ $e'$ thereon, and a means of rotating said cylinder, substantially as described.

22. The combination of the laterally-reciprocating bar W, having the recess $r'$, lever-arms $q$ $q'$, carrying the rollers or pins $s$, entering said recess, slides $b$, ways $c$, rock-shafts $o$ $o'$, lever-arms $n$ $n'$, link $p$, link $m'$, bar $j$ and guides therefor, cam-cylinder P and cam-groove $e$ $e'$ thereon, and a means of rotating said cylinder, substantially as described.

CHAS. T. MASON, Jr.

Witnesses:
F. J. JENEY,
E. M. ANDERSON.